Oct. 22, 1957 — S. E. REIFSNYDER — 2,810,221
STEERING WHEEL ATTACHMENT
Filed Sept. 28, 1955 — 2 Sheets-Sheet 1

Shirley E. Reifsnyder
INVENTOR.

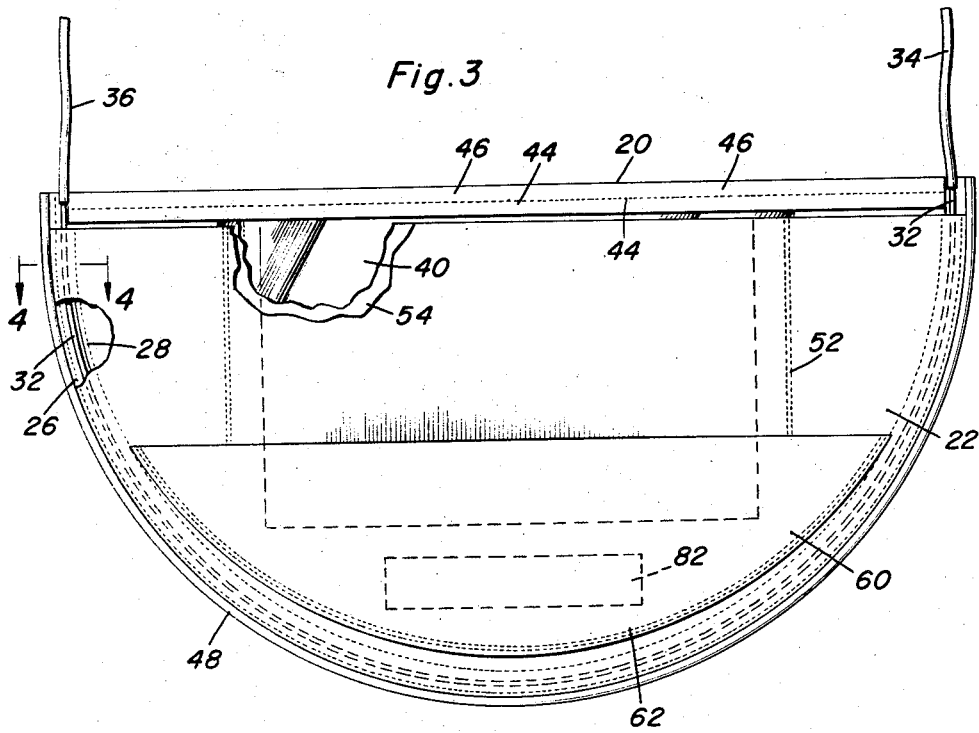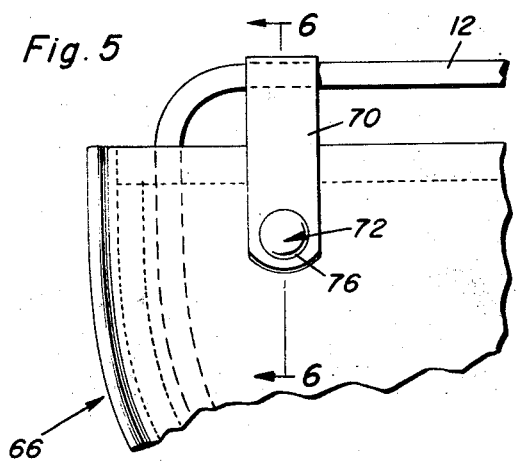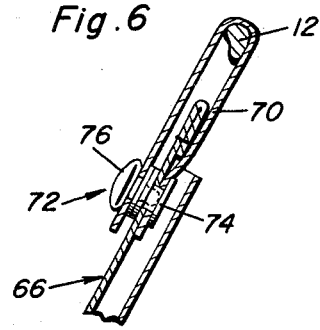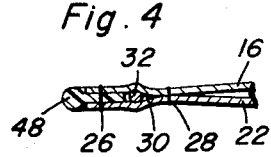

United States Patent Office 2,810,221
Patented Oct. 22, 1957

2,810,221
STEERING WHEEL ATTACHMENT
Shirley E. Reifsnyder, Mount Penn, Pa.

Application September 28, 1955, Serial No. 537,193

7 Claims. (Cl. 40—10)

This invention relates to an attachment for a vehicle steering wheel, and more particularly to an attachment especially arranged to fit on the horn ring of a vehicle steering wheel in order to present to the driver of the vehicle various information and storage facilities.

An object of the present invention is to provide an attachment for a vehicle steering wheel, the attachment having a transparent panel in the upper surface thereof together with means below the transparent panel to store a map, trip chart or any other information peculiar to the desires or needs of the driver of the vehicle.

Another object of the invention is to provide means on the attachment described above which are engageable with the horn ring of the vehicle in order to hold the attachment firmly in place in an accessible position in the vehicle, whereby the information beneath the transparent panel may be viewed as easily and quickly as the instruments of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a bottom plan view of the attachment;

Figure 4 is an enlarged fragmentary sectional view taken substantially on the line 4—4 of Figure 3 and in the direction of the arrows;

Figure 5 is a fragmentary elevational view of a modification of the attachment wherein the means for fastening the attachment to the steering wheel are altered; and Figure 6 is a sectional view taken on the line 6—6 of Figure 5 and in the direction of the arrows.

Figure 1:
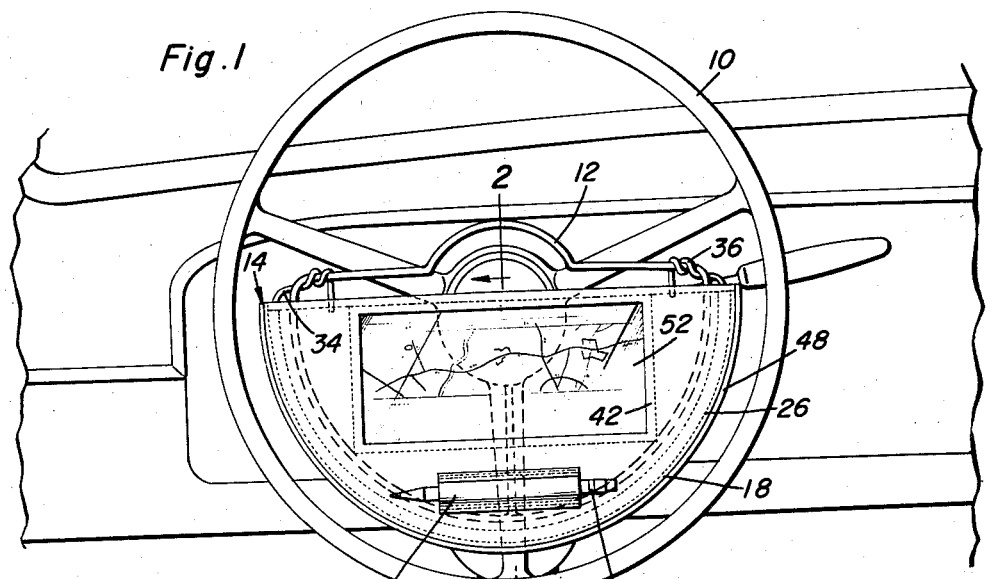
Figure 1 is a fragmentary interior view of a vehicle dash board including the vehicle steering wheel on which the attachment of the invention has been applied.

In order to illustrate the preferred embodiment of the invention, a vehicle steering wheel 10 is shown in Figure 1, this steering wheel being mounted on a steering shaft in a steering column in the usual way and constituting a part of a vehicle. Steering wheel 10 has a horn ring 12 connected thereto, this horn ring being of one of the usual forms provided by the manufacturer of the vehicle.

The attachment 14 for the steering wheel shown in Figures 1-4, is adapted to be connected with the horn ring 12 in order to mount the attachment on the vehicle steering wheel. Attachment 14 consists of an upper panel 16 of a sheet of pliable material, for example, plastic, oilcloth, cloth or any suitable fabric. Sheet 16 has a semicircular edge 18 from the ends of which extend a straight edge 20 at approximately one of the steering wheel diameters. A sheet 22 similar to the sheet 16 is stitched along its semicircular edge 24 to the semi-circular edge 18 by rows 26 and 28 of stitches, the rows of stitches being spaced from each other in order to constitute a pocket 30. A stiffening device, for example, a wire strand 32, is disposed in the pocket 30, and the ends 34 and 36 extend outwardly from the pocket. Wire 32 is bendable so that the ends 34 and 36 may be wrapped around spaced parts of the horn ring 12 in order to hold the attachment 14 in place. Yet, wire strand 32 is sufficiently stiff to function as a stiffener when located in pocket 30. A window opening 38 is provided in the sheet 16, and there is a transparent panel 40 located therebelow. This transparent panel may be of plastic or other transparent material. It is preferably stitched, as at 42, to the sheet 16, and the upper row 44 of stitching which forms the hem 46 at the top of sheet 16 is used to fasten the top edge of the transparent panel 40 in place on sheet 16. Piping 48 is used in the seam formed by the row of stitching 26, and it may be used elsewhere as found desirable.

The sheets 16 and 22 being spaced from each other and stitched together along the edges thereof as described form a pocket 50 in which to accommodate various and sundry material, but especially printed or written matter, for example, map 52, which is disposed beneath the transparent panel 40 and in the vehicle driver's view.

A sheet 54, smaller than sheet 22, is stitched along its lower and side edges, as at 56, to the inner surface of sheet 22 and in pocket 50. This forms an additional pocket 58 in pocket 50 so that various materials, sheets, slips, booklets, etc., may be maintained separate from those in pocket 50.

The bendable ends 34 and 36 have been described as means for fastening the attachment 14 to the steering wheel 10 of the vehicle. To assist in the fastening function, a pocket panel 60 having an arcuate lower edge 62 stitched to the exterior surface of sheet 22 is utilized. This pocket panel has its lower edge arcuate to conform generally to the curvature of horn ring 12 which is seated therein. In attachment of the device 14 to the steering wheel 10 as well as attachment of the device 66 of Figures 5 and 6 to the steering wheel, the attachments are inserted on the wheel in such manner that the horn ring 12 enters the open upper end 64 and seats therein. Then, the bendable wire ends 34 and 36 are attached to the horn ring, as shown in Figure 1.

Figure 2:
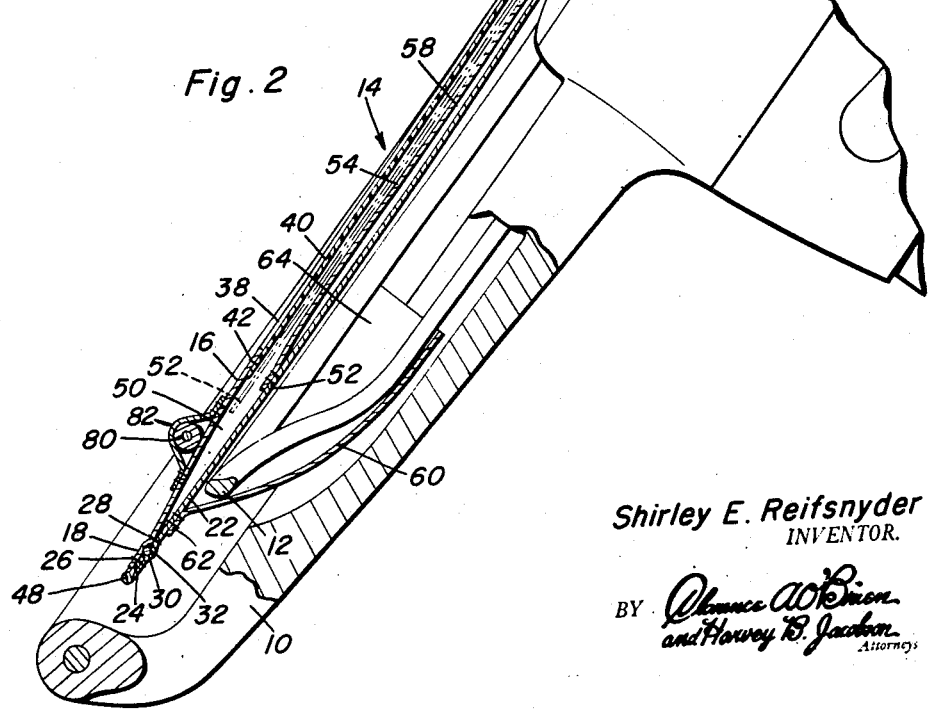
Figure 2 is an enlarged sectional view taken substantially on the line 2—2 of Figure 1 and in the direction of the arrows.

Attention is now invited primarily to Figures 5 and 6 where the horn ring 12 is identical to the previously described horn ring, and the attachment fragment illustrated has structure identical to the attachment of Figure 2. The distinction between Figures 5, 6 and Figure 2 lies in the omission of ends 34 and 36 of the strand 32. In fact, the entire strand may be omitted or retained in Figures 5 and 6, as found desirable.

In place of the bendable ends 34 and 36 of the strand 32, there are a pair of straps 70 held in place by snap fastener 72. This snap fastener has the socket portion 74 riveted or otherwise connected in a conventional manner to one end of strip 70 and presents the open socket on the outer surface of the front sheet of the attachment. The other portion 76 of the snap fastener 72 is secured to the opposite end of the strap 70 and is adapted to be engaged with portion 74. In this way, the horn ring 12 may be strapped in place. Of course, if it is found desirable, the male and female portions of the snap fastener may be interchanged, that is, the socket part may be carried by the free end of the strap or by the fixed end.

Various refinements may be added in the attachments 14 and 66. For example, a pencil 80 may be retained on the exterior of the pockets of the device in a pencil sheath 82 which is stitched or otherwise connected to sheet 16. A battery powered flashlight may be similarly attached to the attachments and a light deflector provided thereover for directing the light rays on the transparent panel 40. In instances wherein no horn rings are provided by the manufacturer on the vehicle, the ends 34 and 36 may be attached directly to the spokes of the vehicle steering wheel, and the same holds true of the straps 70. Other modifications as fall within the scope of the following claims may be made without departing from the invention.

What is claimed as new is as follows:

1. An attachment for a vehicle steering wheel which has a horn ring, said attachment comprising a pair of sheets connected together along edges thereof to form a pocket to store various written and printed matter, one of said sheets having an opening in it through which the printed matter may be viewed, and means carried by said sheets for fastening said sheets to the horn ring of the steering wheel, including a pocket panel secured to one of said sheets and forming a pocket in which a part of the horn ring is disposed.

2. An attachment for a vehicle steering wheel which has a horn ring, said attachment comprising a pair of sheets connected together along edges thereof to form a pocket to store various written and printed matter, one of said sheets having an opening in it through which the printed matter may be viewed, and means carried by said sheets for fastening said sheets to the horn ring of the steering wheel including a pocket panel secured to one of said sheets and forming a pocket in which a part of the horn ring is disposed, together with flexible elements protruding from the upper edges of said sheets and adapted to be connected with other parts of the horn ring.

3. The combination with a vehicle horn ring of: an attachment comprising a pair of sheets of flexible material, means joining said sheets, said means comprising rows of stitches along some of the edges of said sheets and spaced from each other to form a first pocket therebetween, a stiffener disposed in said pocket, said sheets coacting to provide a second pocket, one of said sheets having a transparent panel therein through which to view the interior of said second pocket, and means for attaching said sheets to the vehicle horn ring, including the ends of said stiffener which protrude beyond the second pocket in which said stiffener is located, and means forming a third pocket on one side of one of said sheets and accommodating a portion of the horn ring.

4. In a vehicle steering wheel having a horn ring, an attachment comprising a pair of sheets, means fastening said sheets together along edges thereof to form a pocket, means connected with said sheet for reinforcing the pocket, and means secured to said sheet at three different places for fastening said sheets to the vehicle steering horn ring including a pocket panel which accommodates a portion of the horn ring.

5. A steering wheel attachment for a vehicle steering wheel of the type which has a horn ring, said attachment comprising a pair of sheets having arcuate edges, rows of stitching connecting together said arcuate edges, said sheets having straight edges extending between the ends of said arcuate edges and being spaced from each other to provide an entrance to the pocket formed by said sheets, a pocket panel secured to the outer surface of one of said sheets and having an entrance in which the horn ring of the vehicle may be fitted in order to attach said sheets to the vehicle horn ring, and additional means connected to said sheets for fastening said sheets further to the horn ring of the vehicle.

6. A steering wheel attachment for a vehicle steering wheel of the type which has a horn ring, said attachment comprising a pair of sheets having arcuate edges, rows of stitching connecting together said arcuate edges, said sheets having straight edges extending between the ends of said arcuate edges and being spaced from each other to provide an entrance to the pocket formed by said sheets, a pocket panel secured to the outer surface of one of said sheets and having an entrance in which the horn ring of the vehicle may be fitted in order to attach said sheets to the vehicle horn ring, additional means connected to said sheets for fastening said sheets further to the horn ring of the vehicle, one of said sheets having an opening, a transparent panel secured to said one of said sheets over said opening, and an additional pocket in the pocket which is formed by said sheets.

7. A steering wheel attachment for a vehicle steering wheel of the type which has a horn ring, said attachment comprising a pair of sheets having arcuate edges, rows of stitching connecting together said arcuate edges, said sheets having straight edges extending between the ends of said arcuate edges and being spaced from each other to provide an entrance to the pocket formed by said sheets, a pocket panel secured to the outer surface of one of said sheets and having an entrance in which the horn ring of the vehicle may be fitted in order to attach said sheets to the vehicle horn ring, additional means connected to said sheets for fastening said sheets further to the horn ring of the vehicle, said stitching which connects said arcuate edges of said panels together being in rows and spaced from each other to form a pocket therebetween, and a stiffener for the edges of said sheets disposed in said last mentioned pocket.

References Cited in the file of this patent

UNITED STATES PATENTS

| | | |
|---|---|---|
| 1,693,006 | Thomas | Nov. 27, 1928 |
| 2,048,105 | Cobbs | July 21, 1936 |
| 2,097,419 | Schmidt | Oct. 26, 1937 |
| 2,181,324 | Glover | Nov. 28, 1939 |